United States Patent [19]

Eon et al.

[11] 4,311,051
[45] Jan. 19, 1982

[54] ACCELERATION DETECTOR FOR USE AS A DECELEROMETER FOR THE CONTROL OF ELECTRICALLY OPERATED AXLE BRAKES

[75] Inventors: Christian V. Eon; Jean-Pierre M. C. Dumont, both of Nevers, France

[73] Assignee: Societe Anonyme Francaise Du Ferodo, Paris, France

[21] Appl. No.: 103,059

[22] Filed: Dec. 13, 1979

[30] Foreign Application Priority Data

Dec. 15, 1978 [FR] France .............................. 78 35433

[51] Int. Cl.³ .......................................... G01D 15/08
[52] U.S. Cl. ................................................ 73/517 R
[58] Field of Search ................ 73/516 R, 517 R, 492, 73/503, 514; 303/24 R, 24 A; 188/135, 137, 138, 140 R, 140 A

[56] References Cited

U.S. PATENT DOCUMENTS

| 1,155,471 | 10/1915 | Davis ............................. 73/514 X |
| 2,831,670 | 4/1958 | Bourns et al. .................... 73/516 R |
| 2,987,669 | 6/1961 | Kallmann ........................... 324/45 |
| 3,053,348 | 9/1962 | Stair ............................ 188/138 X |
| 3,157,854 | 11/1964 | Riley ........................... 73/517 R X |
| 3,296,998 | 1/1967 | Kirk ................................ 73/514 |
| 3,646,543 | 2/1972 | Morris ............................ 340/262 |
| 3,953,084 | 4/1976 | Pittet et al. ..................... 303/24 R |
| 4,030,756 | 6/1977 | Eden .............................. 303/24 A |
| 4,079,804 | 3/1978 | Paillard ........................ 73/517 R X |

FOREIGN PATENT DOCUMENTS 1573267 7/1969 France .
2366683 4/1978 France .
2377638 11/1978 France .

Primary Examiner—James J. Gill
Attorney, Agent, or Firm—Charles E. Brown

[57] ABSTRACT

The invention relates to an acceleration detector for use as a decelerometer for controlling an electrically operated axle brake, particularly for a towed vehicle.

The acceleration detector comprises a movable member which is capable of moving against the action of elastic means permanently urging it towards a stop, and a fixed member comprising a proximity detector adapted to generate a voltage proportional to the distance separating it from the movable member.

According to the invention, the stop for the movable member is spaced from the proximity detector by a predetermined distance such that, as soon as the proximity detector is switched on, for example by depressing the brake pedal of the towing vehicle, the output voltage of the detector is other than zero.

9 Claims, 3 Drawing Figures

ACCELERATION DETECTOR FOR USE AS A DECELEROMETER FOR THE CONTROL OF ELECTRICALLY OPERATED AXLE BRAKES

BACKGROUND OF THE INVENTION

The present invention relates generally to acceleration detectors and relates more particularly to the use of such detectors as decelerometers for controlling electrically-operated axle brakes, as used for example for braking a towed vehicle such as a caravan coupled to a towing vehicle, such as a touring car.

In some caravans at least, braking is effected electrically, or more precisely electromagnetically, the control signal for which has to be a function of the deceleration of the towing vehicle, in accordance with the relevant standards. These standards now stipulate on the one hand that a control signal greater than zero should be sent to the brake for the immediate development of a braking couple as soon as the driver of the towing vehicle presses down the brake pedal, and on the other hand that there should then be a linear development of the braking couple provided by the brakes of the caravan as a function of the deceleration of the entire vehicle assembly consisting of the caravan and the towing vehicle.

Thus, the development of this braking couple should be controlled by a decelerometer.

In practice, a decelerometer of this kind is generally mounted on the towing vehicle and consists of a mercury decelerometer comprising a U tube containing mercury, in which the mercury level controls a set of photoelectric cells disposed vertically one above the other opposite a light source.

A mercury decelerometer of this kind has numerous disadvantages.

Firstly, the control signal which it generates is not in practice capable of linear development. Secondly, some adjustment is required as a function of the inclination of the towing vehicle and hence as a function of its loading, and finally, in spite of this adjustment, the signal delivered varies during braking, without any possibility of knowing the corresponding reference, owing to the variation in inclination which the towing vehicle is inevitably subjected to in the course of braking.

The use of other types of decelerometers has been proposed in order to avoid at least some of these drawbacks. This applies in particular to differential transformer decelerometers, i.e. decelerometers comprising a core which is movable relative to fixed windings, the response signal of which is, in practice, unaffected by the inclination of the towing vehicle. However, these decelerometers are expensive, and their response signals are not linear.

Similarly, because of their cost, decelerometers with a quartz strip and a bridge of strain gauges, as used in aeronautics, for example, are not suitable for use in controlling an axle brake for a trailer combination. Furthermore, their response range, which is relatively great, is not adapted to the much narrower range needed for control of this kind.

Finally, it has been proposed to use acceleration detectors of the kind comprising a movable member which is capable of moving against elastic return means which permanently urge it towards a stop, and a fixed member adapted to deliver an output signal as a function of the position of said movable member, said fixed member being a proximity detector capable of delivering a voltage proportional to the distance between itself and the movable member, e.g. a Hall effect sensor.

However, the constructions of this type known at present, if applied to the control of an electrically operated axle brake for a trailer combination, cannot comply with the standard which stipulates that a finite control signal should be sent to a brake of this kind as soon as the brake pedal of the towing vehicle is actuated.

The present invention relates to an acceleration detector capable of being used as a decelerometer which is modestly priced and is capable of meeting the relevant standards applying to electrically operated axle brakes for trailer combinations.

SUMMARY

The invention provides an acceleration detector for use as a decelerometer, comprising a movable member, which is capable of moving against the action of elastic return means permanently urging it towards a stop, and a fixed member comprising a proximity detector adapted to deliver a voltage proportional to the distance separating it from the movable member, wherein the stop of the movable member is located at a distance from the proximity detector.

Thus, from the moment of operation, the output voltage of the proximity detector is greater than zero.

At the same time, the elastic return means for the movable member, which abut on a support stop, are preferably prestressed.

In this way, it is very easy to meet the requirement of the standards stipulating that an initial signal threshold is required as soon as the driver of the towing vehicle depresses the brake pedal.

Preferably, the stop for the movable member and the support stop for the elastic return means for said member are adjustable in position.

Thus the initial signal threshold can very easily be adjusted in the workshop.

DESCRIPTION OF THE PREFERRED EMBODIMENTS

Figure 1:
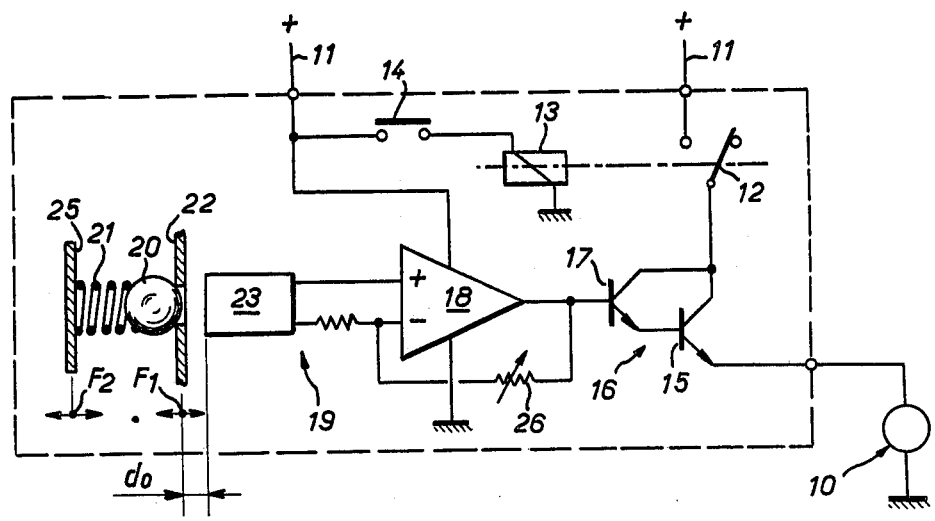
FIG. 1 is a block diagram of an acceleration detector according to the invention in use as a decelerometer, and of the components associated therewith for controlling a receiver of some kind.

The Figures illustrate the application of the invention to the control of an electrically operated axle brake 10, such as the type of electromagnetic brake usually fitted to caravans, operating from a direct current source 11, such as the battery of the towing vehicle to which the caravan is coupled, or an independent battery provided in the caravan.

Interposed in the supply to the brake 10 from the source 11 are provided, on the one hand, a switch contact 12 which, in the example shown, is controlled by a relay 13 in whose supply there is interposed a switch contact 14 controlled by the brake pedal of the towing vehicle in question, in the manner of the stop lights of the vehicle, and, on the other hand, the output transistor 15 of a DARLINGTON assembly 16 acting as the power amplifier.

The input transistor 17 of this DARLINGTON assembly is connected via a variable gain amplifier 18 to a decelerometer designated by general reference numeral 19 in FIG. 1.

In general, this decelerometer comprises a movable member 20 which is capable of moving against the action of elastic return means 21 permanently urging it towards a stop 22, and a fixed member 23 which is adapted to deliver an output signal as a function of the position of said movable member 20.

The fixed member 23 is a proximity detector capable of delivering a voltage proportional to the distance separating it from the movable member 20.

According to the invention, the stop 22 is, by its construction, located at a spacing $d_o$ from the proximity detector 23, so that, as soon as it is operated, its output voltage is greater than zero.

As indicated by a double arrow F1 in FIG. 1, this stop is advantageously adjustable in position parallel to the direction of movement of the movable member 20, i.e. parallel to the axis of sensitivity of the proximity detector 23.

In the embodiment shown, the elastic return means 21 for the movable member 20 consist of a single coil spring and this spring abuts on a support stop 25 which is, overall, parallel to the stop 22 and like the latter is adjustable in position parallel to the direction of movement of the movable member 20 and hence parallel to the axis of sensitivity of the proximity detector 23, as indicated by a double arrow F2 in FIG. 1.

Preferably, for the rest position of the movable member 20, the spring 21 is subject to prestressing and thus holds the movable member 20 against the stop 22.

Figure 2:
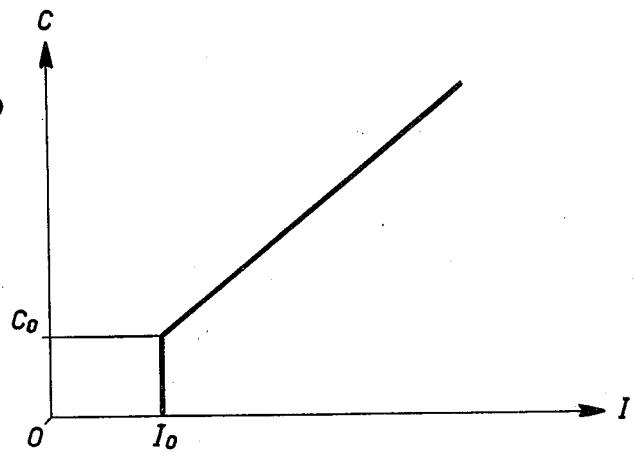
FIG. 2 is a diagram illustrating the manner of action of this decelerometer.

In the diagram in FIG. 2, the intensity I of the current reaching the brake 10 is shown on the x axis and the braking couple C developed by the brake is shown on the y axis.

Unless the brake pedal of the towing vehicle is actuated, the switch contact 12 is open, as shown, and the intensity I is thus zero, as is the braking couple C, as shown by the point 0 in FIG. 2.

As soon as the driver of the towing vehicle depresses the brake pedal, the switch contact 14 closes and, via the relay 13 which it controls, closes the switch contact 12.

The output voltage of the proximity detector 23, resulting from the spacing $d_o$ separating it from the movable member 20, is greater than zero and is rendered sufficient, taking into account the amplification provided by the amplifier 18, for a minimum intensity threshold $I_O$ to reach the brake 10, through the output transistor 15 of the DARLINGTON assembly 16.

The brake members, of the brake 10, are then applied against the disc or drum with which they are associated, and this results in the development of a minimum threshold of a braking couple $C_O$ which is sufficient to apply traction to the coupling by which the caravan is coupled to the towing vehicle.

Initially, the movable member 20 is in contact with its stop 22.

It does not begin to lose this contact, by inertia, and move away from the stop 22 and hence from the proximity detector 23 until the vehicle in which the decelerometer 19 is installed begins to be actually subjected to deceleration; the decelerometer is installed in the vehicle so that its stop 22 faces the rear of the vehicle. It will be appreciated that the decelerometer may be installed either in the towing vehicle or the caravan.

Whichever is the case, the spring 21 is designed so that the distance by which the movable member 20 moves away from the proximity detector 23 varies in a linear manner with the deceleration of this vehicle.

Thus, and also taking into account the fact that the output voltage of the proximity detector 23 is proportional to this spacing, the intensity of the current reaching the brake 10 varies linearly with the deceleration, and the curve representing the development of the braking couple C delivered by this brake is a straight line.

By regulating the gain of the amplifier 18, which comprises a potentiometer 26, it is possible to regulate the gradient of this straight line at will.

The proximity detector 23 may be a winding, the output frequency of which is proportional to the clearance separating it from the movable member 20, whilst in this case a frequency-voltage converter is associated with the winding. However, in a preferred embodiment of the invention, the detector is a Hall effect sensor.

Figure 3:
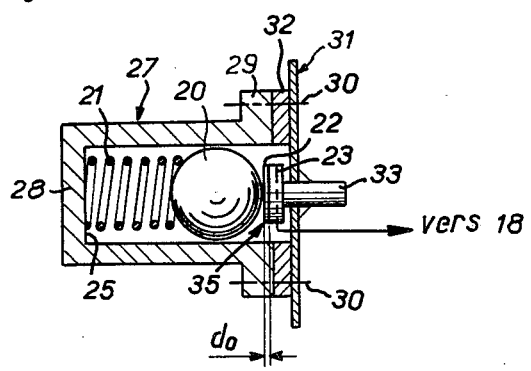
FIG. 3 shows, on a different scale, an axial sectional view of a particular embodiment of decelerometer of this kind.

FIG. 3 shows in greater detail a particular embodiment of a decelerometer using a sensor of this kind.

In this embodiment, the movable member 20 is a ball, in practice a steel ball, which is in gentle frictional engagement within a guide tube 27 of circular cross-section, i.e. the diameter of the ball 20 is substantially equal to the internal diameter of the guide tube 27.

At one of its ends, the guide tube 27 is closed off by a base 28 forming the support stop 25 for the return spring 21 associated with the ball 20, and at its other end it comprises, projecting radially outwards, a flange 29 by means of which it is mounted in removable manner, e.g. by screws 30, as shown by broken lines in the Figure, on a base 31. In this case a first spacer 32 of selected thickness is interposed between the base 31 and the flange 29.

The base 31 incorporates a magnet 33 disposed axially in relation to the ball 20, and at the end of the magnet nearest the ball 20 there is mounted the proximity detector 23, which in practice consists of a Hall effect printed circuit board.

On its face opposite the ball 20, this board comprises a second spacer 35, of selected thickness $d_o$, to act as a stop 22 for the ball 20.

Preferably, this second spacer 35 also constitutes a damping device the effect of which is added to the damping already achieved by the friction of the ball 20 in the guide tube 27, thus helping to obtain low frequency damping, with a very long pulse, so as to avoid any pumping of the trailer brakes. The spacer may for example be made of plastics.

For the same purpose, and to improve the damping achieved by the friction within the guide tube 27, the tube is preferably made of synthetic material, such as for example material sold under the trade name "DELRIN", "ERTALON" or "NYLON".

In any case, by a suitable choice of thickness $d_o$ for the spacer 35, it is possible to adjust the position of the stop 22 and hence the minimum threshold of intensity $I_O$.

Similarly, by a suitable choice of thickness for the spacer 32, it is possible to adjust the position of the support stop 25, and hence the prestressing of the spring 21 and the minimum threshold of the braking couple $C_O$.

The present invention is not limited to the embodiments described and shown but covers all variants within the scope of the appended claims.

Moreover, its field of application is not limited to the control of electrically operated brakes and hence to the control of electrically operated axle brakes. On the contrary, it extends to the control of any suitable receiver.

In addition, the device according to the invention can advantageously function as an accelerometer as well as a decelerometer, depending on the way it is mounted in relation to the direction of movement of the vehicle in question.

Moreover, it may be used for the absolute measurement of deceleration, or acceleration, by the use of a galvanometer.

The control signal generated by the proximity detector can be a positive or negative voltage.

I claim:

1. An acceleration/deceleration detector comprising a movable member responsive to accelerations or decelerations, resilient biasing means urging said movable member into abutment against stop means in the absence of acceleration or deceleration, a fixed proximity detector means for delivering a voltage proportional to its distance from said movable member, said stop means being spaced from said proximity detector means with the spacing being one wherein said proximity detector means provides a nonzero output voltage as soon as said detector is put into operation, said movable member comprising a guide tube of circular cross-section, a ball, and said ball being disposed in said guide tube, the diameter of said ball being substantially equal to the internal diameter of said guide tube with said ball having a gentle frictional engagement with said guide tube.

2. A detector according to claim 1, wherein there are means for adjusting the position of said stop means for the movable member.

3. A detector according to claim 1, wherein said resilient biasing means for the movable member abut against an adjustable support surface with said resilient biasing means being prestressed.

4. A detector according to claim 1, wherein said resilient biasing means bears at one end against a support surface and at the other end against said movable member, and said proximity detector means is disposed on the side of said stop means remote from said movable member.

5. An acceleration or deceleration detector, said detector comprising a movable member, elastic return means permanently urging said movable member towards stop means, and a fixed member comprising a proximity detector means for delivering a voltage proportional to the distance separating said proximity detector means from said movable member, said stop means for said movable member being spaced from said proximity detector means with the spacing being one wherein as soon as said proximity detector means is put into operation the output voltage of said proximity detector means is nonzero, said movable member being disposed in a guide tube in gentle frictional engagement with said guide, said guide tube being closed at one end by an end wall forming a support surface for said elastic return means, said guide tube being removably mounted at its other end on a base with spacer means of selected thickness interposed between said guide tube and said base, said proximity detector means being mounted on said base along the axis of movement of said movable member, and second spacer means of selected thickness being mounted on said proximity detector means facing the movable member and defining said stop means.

6. A detector according to claim 5 wherein said guide tube is circular in cross-section and said movable member is a ball, the diameter of said ball being substantially equal to the internal diameter of said guide tube.

7. A detector according to claim 5, wherein said second spacer means also forms vibration damping means.

8. A detector according to claim 1, wherein said proximity detector means is connected to a variable gain amplifier.

9. A detector according to claim 1 or 5, wherein said proximity detector means comprises a Hall effect sensor.

* * * * *